United States Patent [19]

Eriksson

[11] Patent Number: 5,482,537
[45] Date of Patent: Jan. 9, 1996

[54] GAS FILTERING APPARATUS

[75] Inventor: Timo Eriksson, Karhula, Finland

[73] Assignee: A. Ahlstrom Corporation, Noormarkku, Finland

[21] Appl. No.: 246,222

[22] Filed: May 18, 1994

[51] Int. Cl.⁶ .................... B01D 29/05; B01D 29/66; B01D 35/18
[52] U.S. Cl. .................. 95/273; 95/280; 95/288; 55/269; 55/302; 55/341.1; 55/523
[58] Field of Search .................. 95/273, 280, 285; 55/267, 269, 284, 302, 341.1–341.7, 523

[56] References Cited

U.S. PATENT DOCUMENTS

| | | | |
|---|---|---|---|
| 3,948,623 | 4/1976 | Ostby et al. | 55/284 X |
| 3,951,627 | 4/1976 | Barr, Jr. et al. | 55/284 |
| 4,343,631 | 8/1982 | Ciliberti | 55/302 |
| 4,395,268 | 7/1983 | Zabelka | 55/269 X |
| 4,584,003 | 4/1986 | Oda et al. | 55/269 |
| 4,764,190 | 8/1988 | Israelson et al. | 55/269 |
| 4,765,809 | 8/1988 | Reichel et al. | 55/267 |
| 4,869,207 | 9/1989 | Engström et al. | 55/269 X |
| 4,881,958 | 11/1989 | Eckardt et al. | 55/269 X |
| 4,904,287 | 2/1990 | Lippert et al. | 55/302 |
| 5,078,760 | 1/1992 | Haldipur et al. | 55/302 X |
| 5,143,530 | 9/1992 | Haldipur et al. | 55/302 X |
| 5,242,472 | 9/1993 | Sellakumar | 55/302 X |
| 5,284,498 | 2/1994 | Davis et al. | 55/302 X |
| 5,335,492 | 8/1994 | Zirkel | 55/267 X |

FOREIGN PATENT DOCUMENTS 422430  4/1974  U.S.S.R. .................. 55/302

Primary Examiner—Robert Spitzer
Attorney, Agent, or Firm—Nixon & Vanderhye

[57] ABSTRACT

Either atmospheric or superatmospheric pressure high temperature gases, e.g. from a fluidized bed reactor, are filtered in an upright outer vessel having at least one upright inner vessel within it. The inner vessel has gas-impervious peripheral walls and divides the gas volume in the outer vessel into clean and dirty gas volumes. A number of monolithic ceramic filter elements are mounted in openings disposed in the peripheral walls of the inner vessel and allow clean gas to flow through the filter elements from the dirty gas volume to the clean gas volume. The peripheral wall includes cooling panels formed of cooling tubes, which can lower the temperature of the filter mounting structure significantly. The cooling tubes are normally protected by refractory material from direct contact with the gases so that only the mounting structures are cooled (i.e. the gas is not significantly cooled); however the structure can also be used to cool the gas if a high throughput of cooling or other cooling fluid passes through the cooling tubes, and/or direct contact between cooled components and the gas is provided.

21 Claims, 7 Drawing Sheets

GAS FILTERING APPARATUS

BACKGROUND AND SUMMARY OF THE INVENTION

This invention relates to an apparatus for filtering high temperature gases, such as high pressure gases discharged from a circulating fluidized bed reactor. The filtration apparatus typically comprises porous ceramic filter elements. The present invention also related to a method for filtering high temperature gases containing solid contaminants and for efficiently removing accumulated solids from the filtering elements in a safe manner.

It is known in the prior art to use ceramic filters, in order to remove particulates from hot gas streams. It is e.g. known to use candle type ceramic filters (as shown in U.S. Pat. No. 4,869,207) support by a cooled tube sheet for cleaning hot gases. The size of such a filter unit is however presently limited, the practical limit for the diameter of a pressure vessel with candle type filter being about 3-5 m.

It is also known to use ceramic through flow filter tubes vertically supported by cooled support plates in filter units. The size of these filter unit housings are practically restricted as it is difficult to make large water cooled support plates having e.g. diameters larger than 2 m, due to expansion of the vessel itself and due to rigidity required of the support plate.

It is also known that it is essential to have the filters cleaned, e.g. after certain pre-determined operating periods, in order to be able to maintain the desired pressure drop. Commonly used methods of cleaning the filter employ a reverse directional pulse of gas for flushing the filter.

In order to provide larger filter units it has been suggested to provide a filtration housing having cooled walls and a plurality of tubes mounted horizontally within the dirty gas space in the filtration housing. The tubes reaching e.g. from one wall to the opposite wall within the filtration housing. If however large amounts of solid particulates are to be filtrated from the gas then particulate matter accumulating on the tubes may easily cause plugging problems. The filter units have to be pulsed frequently. Pulsing of filter tubes has to be done such that no damage is caused to the fragile ceramic tubes, which may be difficult to avoid. The arrangement of horizontal tube filters provides an advantage over conventional candle type filters in so far that larger filter units may be built, but still larger units with higher filtration area per filter housing volume and more easily to be cleaned filters are desired.

It has also been suggested to utilize porous monolithic ceramic filters providing a high filtration area per filter housing volume. The monolithic ceramic filters have a plurality of passageways extending longitudinally from inlet end to outlet end, but the passageways being plugged to prevent direct passage of the feed stock through the passageways from the inlet face (dirty gas side) to the outlet face (clean gas side) forcing clean gas to pass through the porous ceramic material into an adjacent passageway being connected to the clean gas side of the filter. The cleaning capacity of clusters of such monolithic ceramic filters is much higher than of conventional candle type or tubular ceramic filters. The monolithic ceramic filters thereby being less space consuming than conventional tubular or candle type ceramic filters.

The mounting of these monolithic elements in filtration vessels in high temperature surroundings and possible temperature variations has however led to very complicated and expensive constructions. When cleaning high temperature gases from combustors, gasifiers or the like, the whole filtration vessel construction is heated, and has to be made of expensive heat resistant material. It is therefore economically impractical to build large filtration units.

Side walls in a high temperature filtration unit, including monolithic filter elements, tend to "live", expand, when the unit is heated, whereby joints between monolithic filter elements and side walls also "live" and cause problems.

It is an object of the present invention to provide an improved apparatus for filtering high temperature gases.

It is especially an object of the present invention to provide a high temperature high pressure ceramic filtration unit for pressurized combustion, gasification or related processes to overcome aforementioned problems and to furnish an inexpensive, simple and reliable gas cleaning apparatus.

According to one embodiment of the present invention, an apparatus for filtering high temperature gases both from pressurized (i.e. superatmospheric pressure) systems and atmospheric systems, is provided. The filtration apparatus comprises following elements:

a generally upright outer vessel having a top, a bottom and a side wall;

at least one generally upright inner vessel, being disposed within said outer vessel, said inner vessel having generally impervious peripheral walls preventing gas from flowing through said walls and dividing the gas space in said outer vessel into a dirty gas space and a clean gas space, a plurality of monolithic ceramic filter elements disposed in openings arranged in said peripheral walls of said inner vessel, allowing clean gas to flow through said filter elements from one side of the peripheral wall of said inner vessel to the other, and wherein said peripheral wall includes cooling elements, such as cooling tubes with a coolant such as water, steam or air.

In a preferred apparatus embodiment an upright inner vessel is constructed of water tube panels, in which adjacent vertical water tubes are connected to each other by fins. The inner vessel is disposed concentrically in the outer vessel and the monolithic ceramic filter elements are connected by their inlet dirty ends to openings in the water tube panels. The main part of the filter elements, with the clean gas ends, protrude through the water tube panels into the clean gas space, only a very small portion $<\frac{1}{3}$ of the length of the filter element or almost nothing at all of the filter element protruding into the dirty gas space. Means for back pulsing the filter elements are provided in front of the clean gas ends of the filter elements.

In one exemplary embodiment of the filtration apparatus an inlet for dirty gas is provided in the top of the outer vessel, a support plate is provided in the upper part of the outer vessel, the support plate dividing the gas space in the outer vessel into a dirty gas side above the support plate and a clean gas side below said support plate. The upper end of the inner vessel is connected to an opening in the support plate, such that the main part of the inner vessel is disposed below the support plate. The interior of the inner vessel is connected through the opening in the support plate to the dirty gas side above the support plate. A clean gas space is prevailing on the outside of the inner vessel. The filter elements protrude from the dirty gas side of the inner vessel outward into the clean gas space outside the inner vessel. A clean gas outlet is provided in a side wall of the outer vessel below the support plate. A solid particle outlet is provided in the bottom of the inner vessel, the solid particle outlet being connected to a solid particle outlet in the bottom of the outer vessel.

Monolithic ceramic filter elements may be connected in different modes to the openings in the water tube panels or walls. The openings may be provided in broad fins between adjacent water tubes, the width of said broad fins being mainly of the same magnitude as the diameter of said filter elements, such that a filter element may be inserted in the opening. The filter elements being e.g. circular, square or polygonal in cross section. The monolithic ceramic filter elements may alternatively be connected to openings provided in a water tube panel by bending apart two adjacent or more water tubes to provide a distance between said water tubes corresponding to the diameter of said ceramic filter elements.

A layer of refractory lining may be provided to cover each side of the water tube panel, such that the ends of the ceramic elements and the surface of the layer of refractory lining form a mainly smooth outer and inner surface in the inner vessel.

According to another preferred embodiment of the present invention the apparatus may include an inner vessel wall in which openings for filter elements are provided in several parallel vertical rows at a distance from each other. The openings are provided one on top of the other at a distance from each other. Connecting elements are provided at least in the vertical parts of the openings in order to connect the filter elements to the peripheral wall construction, i.e. for providing a seat for the monolithic ceramic filter elements in the openings.

The vertical water tube panels, formed of e.g. 2–4 vertical water tubes connected by fins, and used to cool the peripheral wall have mainly the same horizontal width as is the length of a ceramic element and the panels are mounted between the vertical rows of filter elements, perpendicular to the wall plane. According to this embodiment the water tube panels are mainly at a 90° angle to the plane of the inner surface of the inner vessel. The panels thereby do not form a conventional water tube walls in the vessel. E.g. in a cylindrical vessel the separate water tube panels form radially disposed cooling panels between the rows of filter elements.

In order to form a peripheral wall for the inner vessel additional elements, such as refractory lined metal plates or other refractory lined constructions may be used to combine adjacent water tube panels with each other and thus form a gas tight enclosure for the inner vessel. The water tube panels efficiently cool the connecting elements needed for locking the filter elements into the openings in the peripheral wall. The cooling may be still improved by connecting bars or fins between the cooling tubes and the connecting elements. The cooling of the connecting elements prevents undue expansion thereof and provides a reliable seat for the filter elements. Further the tube panels, which are disposed perpendicularly in the peripheral wall of the inner vessel, form stabilizing and supporting elements in the overall construction of the inner vessel.

In an alternative exemplary embodiment of the filtration apparatus there is an inlet for dirty gas in the side wall of the outer vessel, a support plate in the upper part of the outer vessel, the support plate dividing the gas space in the outer vessel into a clean gas side above the support plate and a dirty gas side below the support plate. The upper end of the inner vessel is connected to an opening in the support plate, such that the main part of the inner vessel is disposed below the support plate. The interior of the inner vessel is connected through the opening in the support plate to the clean gas side above the support plate and a dirty gas space is prevailing on the outside of the inner vessel. Thereby the filter elements protrude from the dirty gas side of the inner vessel inward into the clean gas space inside the inner vessel. A clean gas outlet is provided in the top of the outer vessel above the support plate, and a solid particle outlet is provided in the bottom of the outer vessel.

In still another alternative exemplary embodiment of the filtration apparatus there is an inlet for dirty gas in the top of the outer vessel, an inner vessel below the inlet for dirty gas and a guiding element between the inlet and the inner vessel, for guiding dirty gas flowing through the inlet into the outer vessel radially outward. A dirty gas space is provided on the outside of the inner vessel and a clean gas space on the inner side of the inner vessel. A solid outlet conduit is provided in the bottom of the outer vessel and a clean gas outlet conduit in the inner vessel.

According to the present invention it is easy to control the temperature of constructions around ceramic filter elements mounted in openings in a peripheral wall of a filtration chamber. The temperature of the peripheral wall of the inner filtration vessel, carrying the filter elements, is easy to predict at all times. Sudden high temperature peaks are avoided, thereby minimizing the danger of thermal shock related damages.

Other advantages arising from cooling the peripheral walls of the inner filtration vessel include:

expansion of the inner vessel easily controlled;

the support structure of the ceramic elements can be more easily arranged;

the temperature of the filtration vessel materials may be held lower and more easily handled;

the filtration system can be started up in a shorter time and can withstand higher temperature variations, temperature variations during back pulsing do not cause problems, and gas can be cooled simultaneously as it is cleaned.

Further the ceramic elements may be supported such that one end of the filter element or both ends of the filter element are free to thermal expansion, as the element is rather short compared to tubular ceramic filters needing supports at both ends. The monolithic ceramic filter elements may be packed in a very compact configuration permitting a smaller outer pressure vessel.

Also other advantages are achieved especially when back pulsing the ceramic filters, when the filter elements are disposed with their clean ends protruding rather deep, e.g. >½ of them, into the clean gas space e.g. inside the vessel. The high pressure cleaning pulse thereby compresses the portions of the ceramic filter elements being inside the tubular chamber from all sides, preventing mechanical breaking of the filter elements.

DETAILED DESCRIPTION OF THE DRAWINGS

Figure 1A:
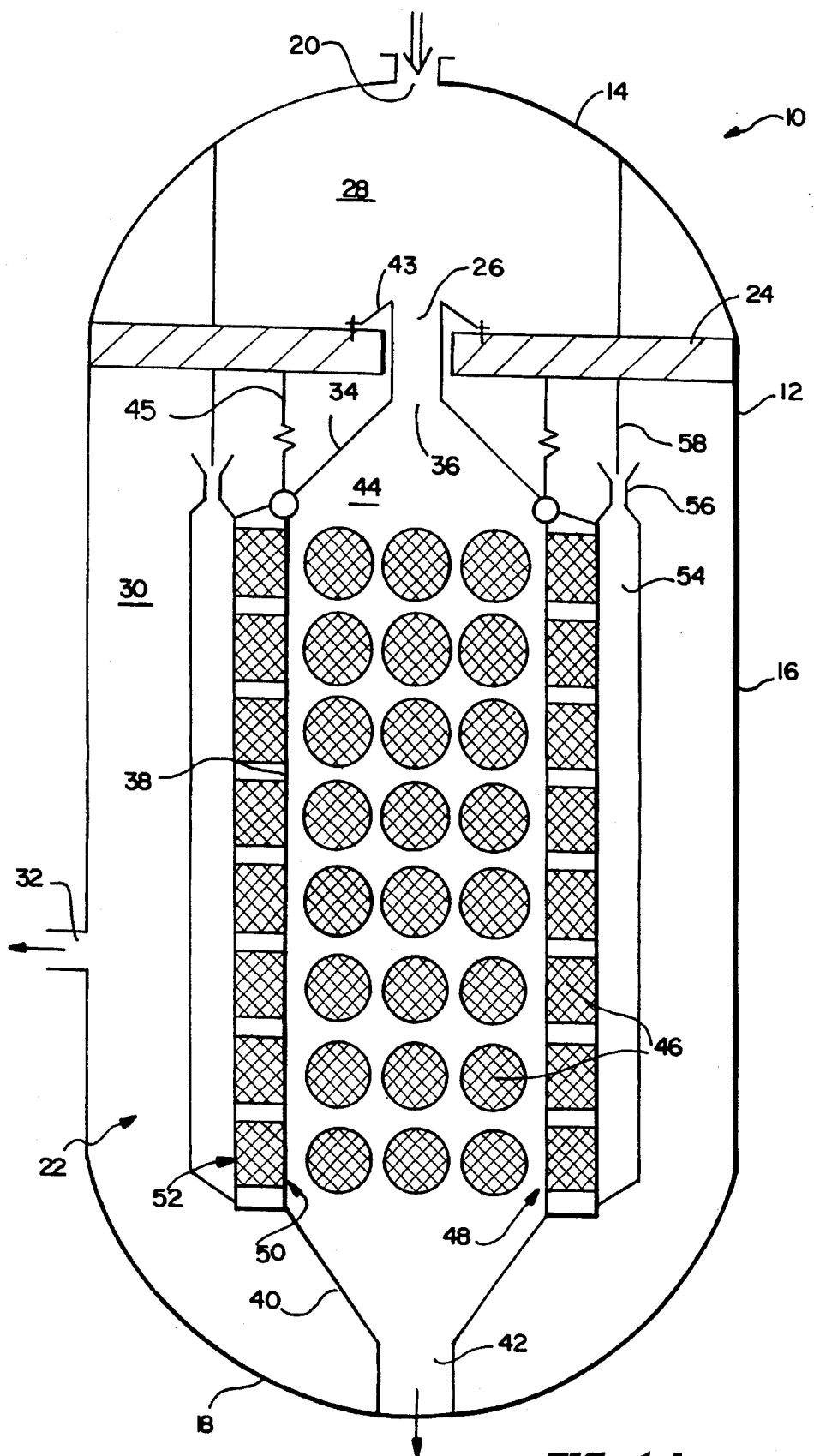
FIGS. 1a and 1b are schematic side cross-sectional views of exemplary filtration apparatuses according to the present invention.

An exemplary filter assembly for high temperature gases is shown generally by reference numeral 10 in FIG. 1a. It includes a generally upright outer vessel 12 having a top 14, side wall 16 and bottom 18. In the top 14 is a gas inlet 20 for particle laden high temperature dirty gas. The inlet can e.g. be connected to a fluidized bed combustor, gasifier or the like. A filtration module or a generally upright inner filtration vessel 22 is disposed in the outer vessel. A generally horizontal the inner vessel 22 supporting plate 24 is provided in the upper part of the outer vessel 12, in this embodiment having a through extending opening 26. The support plate 24 divides the interior of the outer vessel 12 in a dirty gas space 28 above the support plate and a clean gas space 30 below the support plate. A clean gas outlet 32 is provided in the side wall 16 of the outer vessel.

The filtration module or the inner vessel 22 has a top 34 with a gas inlet opening 36 therein, vertical side walls forming the main peripheral walls 38 in the inner vessel and a bottom 40 with a solid discharge outlet opening 42 therein. The gas inlet opening 36 in the top 34 is connected to the opening 26 in the support plate 24 for connecting the dirty gas space 28 above the support plate with the gas space 44 within the inner vessel 22, but preventing gas flow between clean gas space 30 and the inner gas space 44 or the dirty gas space 28 above the support plate. The top 34 of the inner vessel is flexibly mounted with elements 43 to the opening 26 in the support plate and supported by flexible support bars 45, both allowing some thermal expansion but keeping the inner vessel in gas tight connection with the opening in the support plate. The solids outlet opening 42 is gas tightly connected to an outlet opening in the bottom 18 of the outer vessel.

Figure 1B:
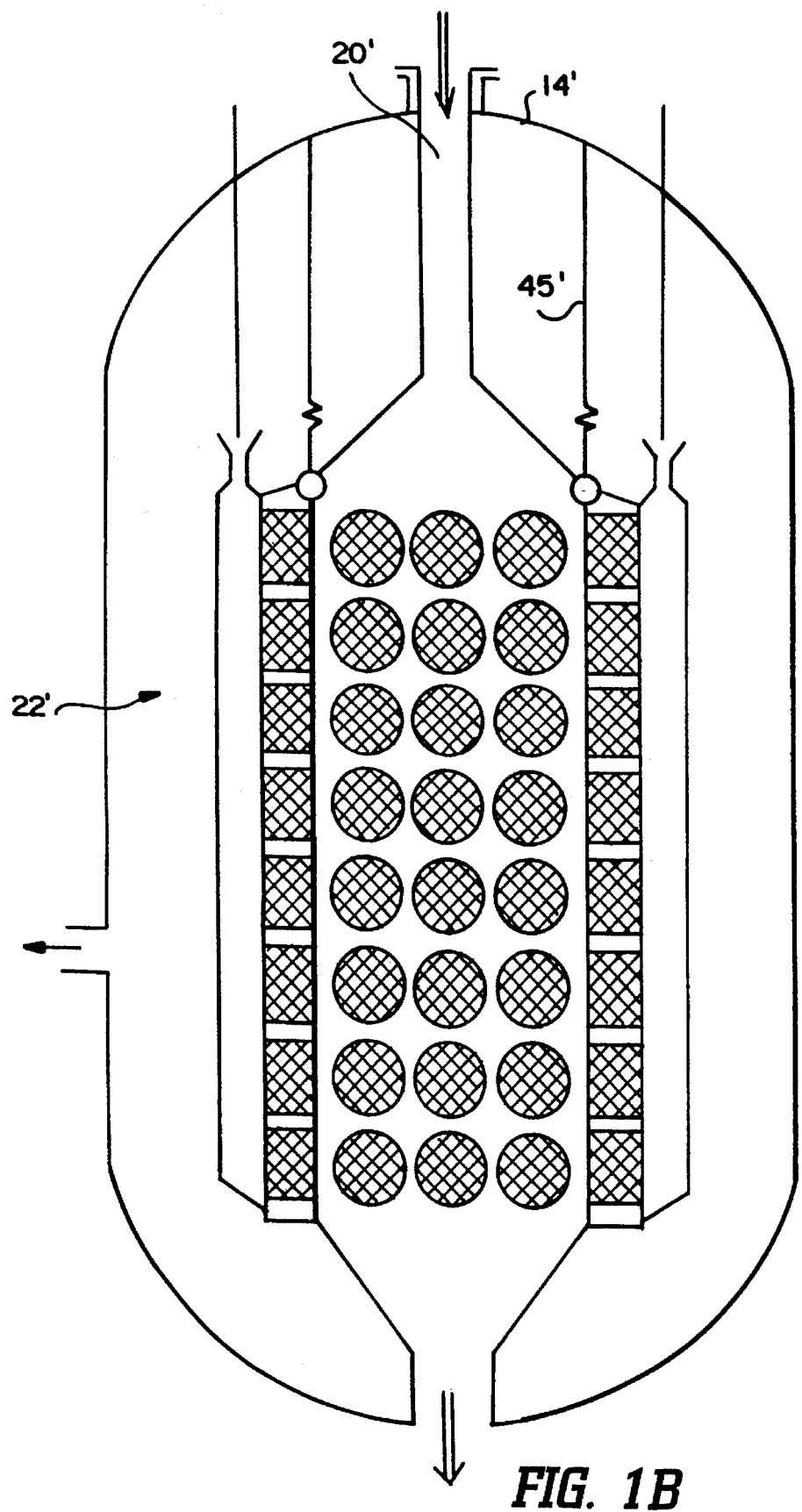

In the related apparatus shown in FIG. 1b the inner vessel 22' is supported by bars 45' in the top of the outer vessel.

In FIG. 1a the peripheral side walls 38 of the inner vessel form a generally gas tight enclosure. Porous monolithic ceramic filter elements 46 are inserted in openings 48 formed in vertical rows one on top of the other in the peripheral wall 38, for allowing clean gas to pass through the filter elements 46 from the dirty gas volume inside the inner vessel to the annular clean gas volume 30 between the outer and inner vessel walls 16 and 38. The filter elements 46 are joined in a gas tight manner with the side wall 38. Particles separated by the filter elements from the dirty particle laden gas accumulate on the surface of the filter elements 46.

The monolithic ceramic filter elements 46, which may be cylindrical in form and have an inlet end 50 and an outlet end 52, protrude almost their entire length out of the peripheral wall 38 into the clean gas volume 30. The ceramic filter elements 46 may be protected in the openings 48 by a metal sleeve, not shown in FIG. 1a, but shown in co-pending application Ser. No. 08/246,221 filed May 18, 1994, the disclosure of which is incorporated by reference herein. The metal sleeve is also cylindrical and has generally the same diameter as the ceramic filter element 46. The sleeve is e.g. shrunk around the ceramic filter element and welded in a gas tight manner to the opening 48 in the peripheral wall 38. A heat transfer insulation and/or a seal may be provided between the sleeve and the ceramic filter element 46 if necessary.

Means for back pulsing (backflushing) the ceramic filter elements 46 are provided in front of the clean outlet side 52 of the filter elements 46. The means for back pulsing include a back pulsing chamber 54 having a venturi shaped outlet 56 and a gas injecting nozzle 58. The back pulsing chamber 54 shown in FIG. 1a includes an elongated chamber covering all filter elements in one vertical column, each column having a separate back pulsing chamber in front of the filter elements at their clean outlet side. Clean gas flowing through the filter elements into the back pulsing chamber is discharged from the back pulsing chamber through a venturi shaped outlet 56 into the free clean gas space 30. A back pulsing nozzle 58 is disposed to pulse cleaning gas at high pressure into the venturi outlet thereby causing a high pressure pulse inside the back pulsing chamber and causing gas to flow from the back pulsing chamber into the inner vessel simultaneously dislodging solid particulates accumulated on the dirty side 50 of the filter elements. Dislodged solid material falls into the outlet 42 and is discharged.

Back pulsing chambers combining filter elements in different configurations may be used, such as ring shaped back pulsing chambers or back pulsing chambers back pulsing only a few or even only one filter element at the time.

The filter elements 46 protruding deep into the back pulsing chamber prevents the filter elements from breaking even during high pressure back pulsing, as back pulsing pressure will compress the filter element 46 at all sides and thereby e.g. prevent different ceramic layers from being separated from each other.

Figure 2:
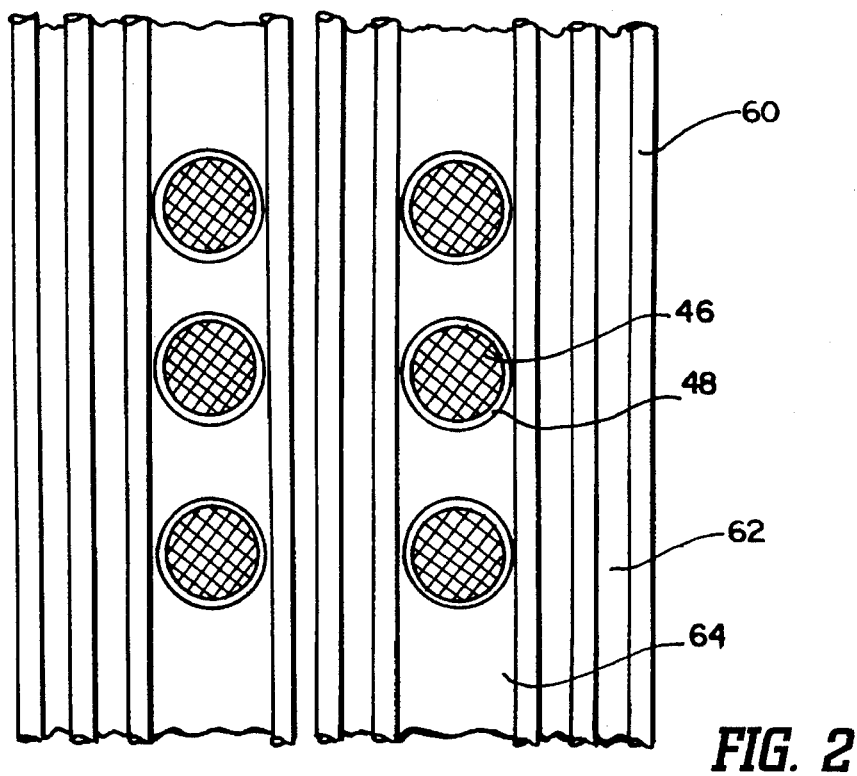
FIG. 2 is an enlarged front view of a section of a tube wall panel in the exemplary filtration apparatus in FIG. 1 according to the present invention.

The peripheral wall 38 of the inner vessel 22 is a cooled wall made of water tubes 60, as can be seen in FIG. 2. Adjacent water tubes 60 are connected by fins 62, 64. Some of the fins 64 being broad enough to include openings 48 in which filter elements 46 can be inserted.

Figure 3:
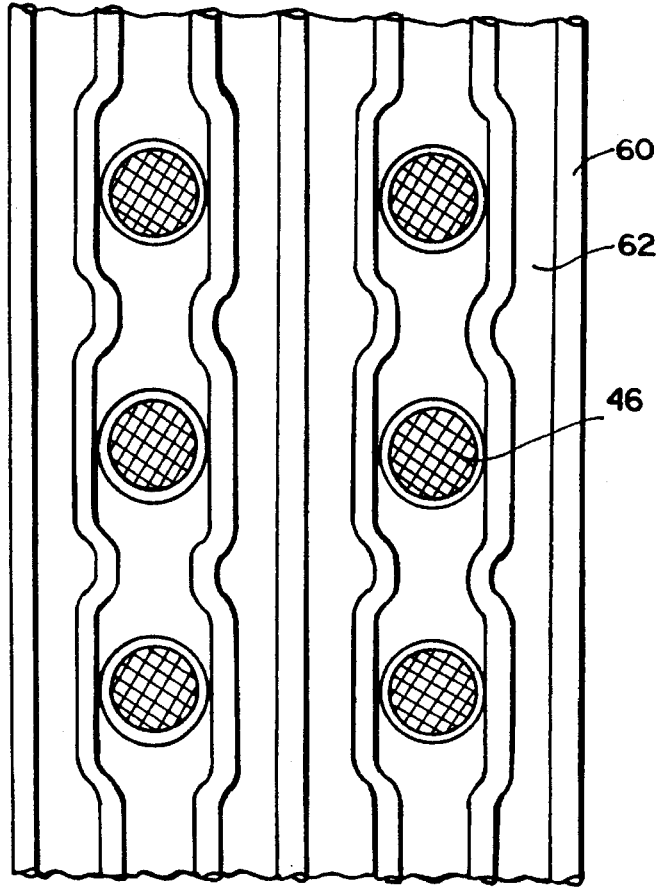
FIG. 3 is an enlarged front view of a section of another tube wall panel in another exemplary filtration apparatus according to the present invention.

FIG. 3 shows another water tube wall in which all water tubes 60 are generally combined by conventional narrow fins 62. In order to be able to provide openings 48 for filter elements 46 two adjacent water tubes are bent away from each to provide a space large enough for inserting a filter element. Openings may be made by bending several adjacent water tubes in the plane or if necessary out of the plane perpendicularly to the water tube wall in order to provide openings for the filter elements.

Figure 4:
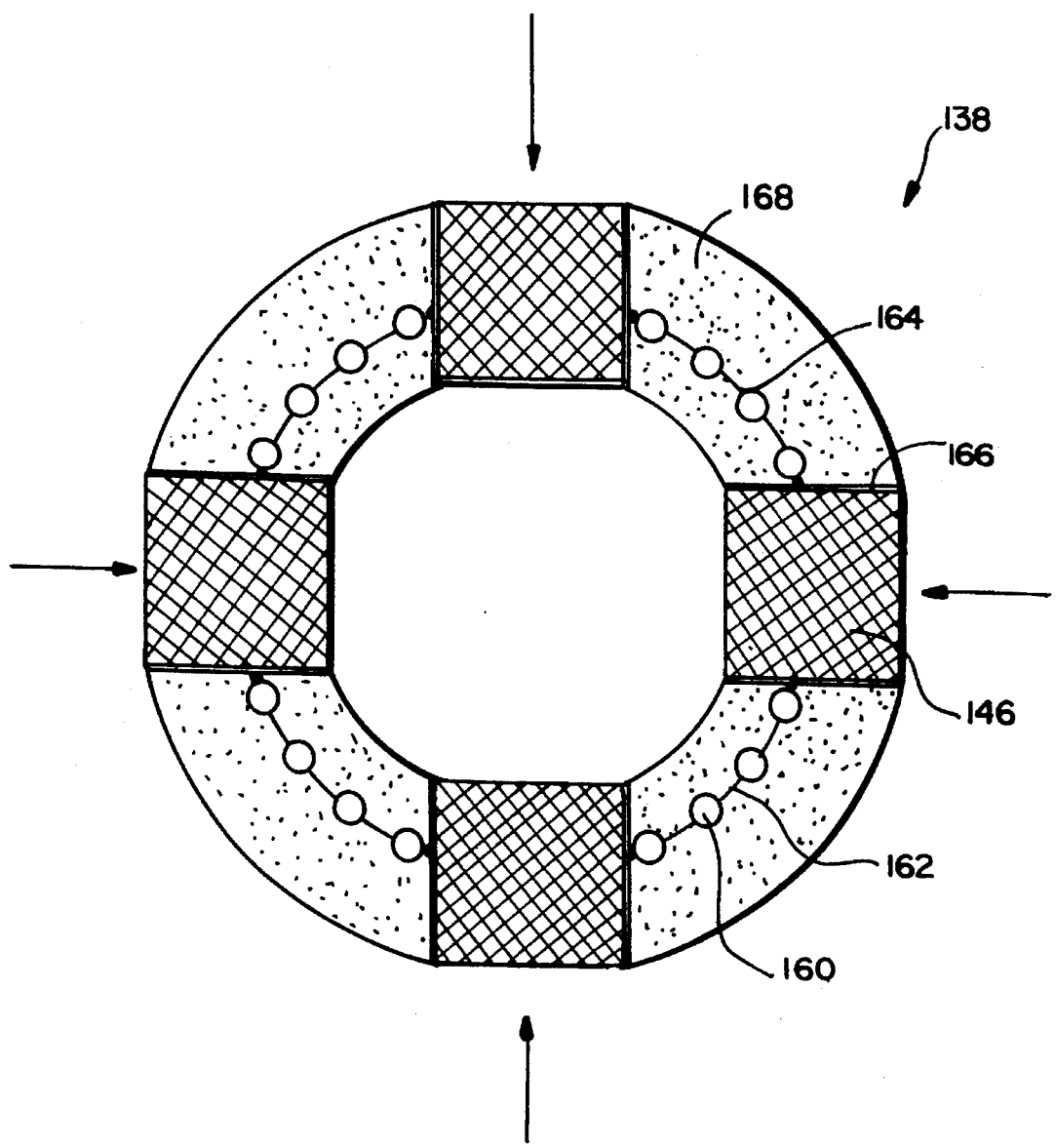
FIG. 4 is a horizontal cross-section of an inner vessel of a further exemplary filtration apparatus according to the invention.

FIG. 4 shows a horizontal cross section of an inner vessel being formed of water tube panels. In FIG. 4 components comparable to those in the FIGS. 1 through 3 embodiment are shown by the same reference numeral only preceded by a "1". The peripheral wall 138 has openings between the water tube panels 164 for filter elements 146. The filter elements are surrounded by a metal sleeve 166 which is connected by e.g. welding to the water tubes panels 164, the panels thereby efficiently cooling the sleeve. The water tube panels are covered by refractory lining 168 in order not to cool the gas flowing inside and outside the inner vessel. The refractory lining also provides a smooth outer and inner surfaces to the vessel. Smooth surface on the dirty gas side prevents solid particles from accumulating on the outside of the filter elements. Cooling tubes 160 for circulating water or the like are connected together by fins 162 to provide the cooling tube panels 164.

Figure 5:
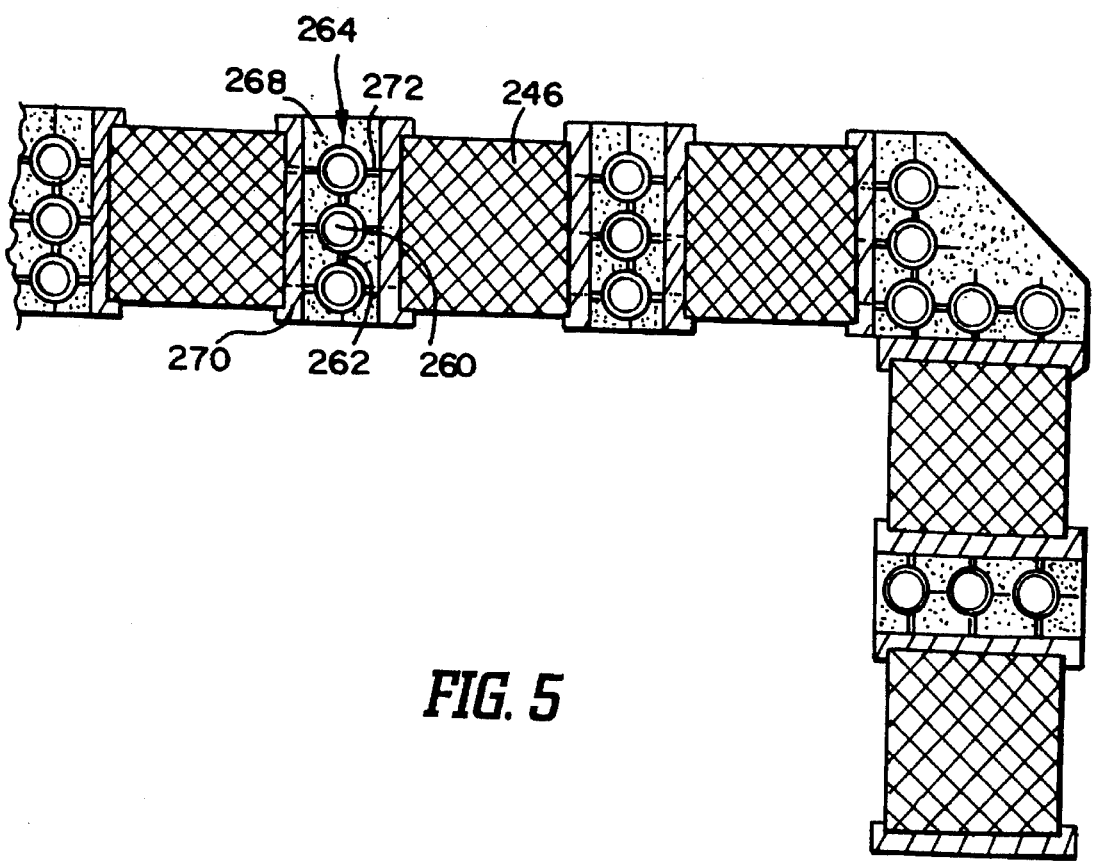
FIG. 5 is an enlarged horizontal cross-sectional view of a section of a peripheral wall of an inner vessel of still another exemplary filtration apparatus according to the present invention.

FIG. 5 shows a section of a horizontal cross-section of another inner vessel including water tube panels in the peripheral wall. In FIG. 5 components comparable to those in the FIGS. 1 through 4 embodiment are shown by the same reference numeral only preceded by a "2". In FIG. 5 water tube panels 264 are disposed in the peripheral wall between filter elements 246 perpendicularly to the plane of the wall. The filter elements 246 are seated in openings in the peripheral wall with the aid of connecting elements 270. The water tube panels 264 (formed by cooling tubes 260 connected together by fins 262) and the connecting elements 270 are brought into heat transfer connection by fins or bars 272 connecting them to each other. The tube panels 264 are covered by insulating material such as fiber insulation or refractory lining 268. Above and below the filter elements the peripheral wall may be formed by metal plate connecting adjacent tube panels 264 and being covered by refractory lining. The tube panels 264 provide a very efficient cooling of connecting elements 270 along their entire length. The tube panels provide a good supporting structure, which is stiff and easy to seal.

Figure 6:
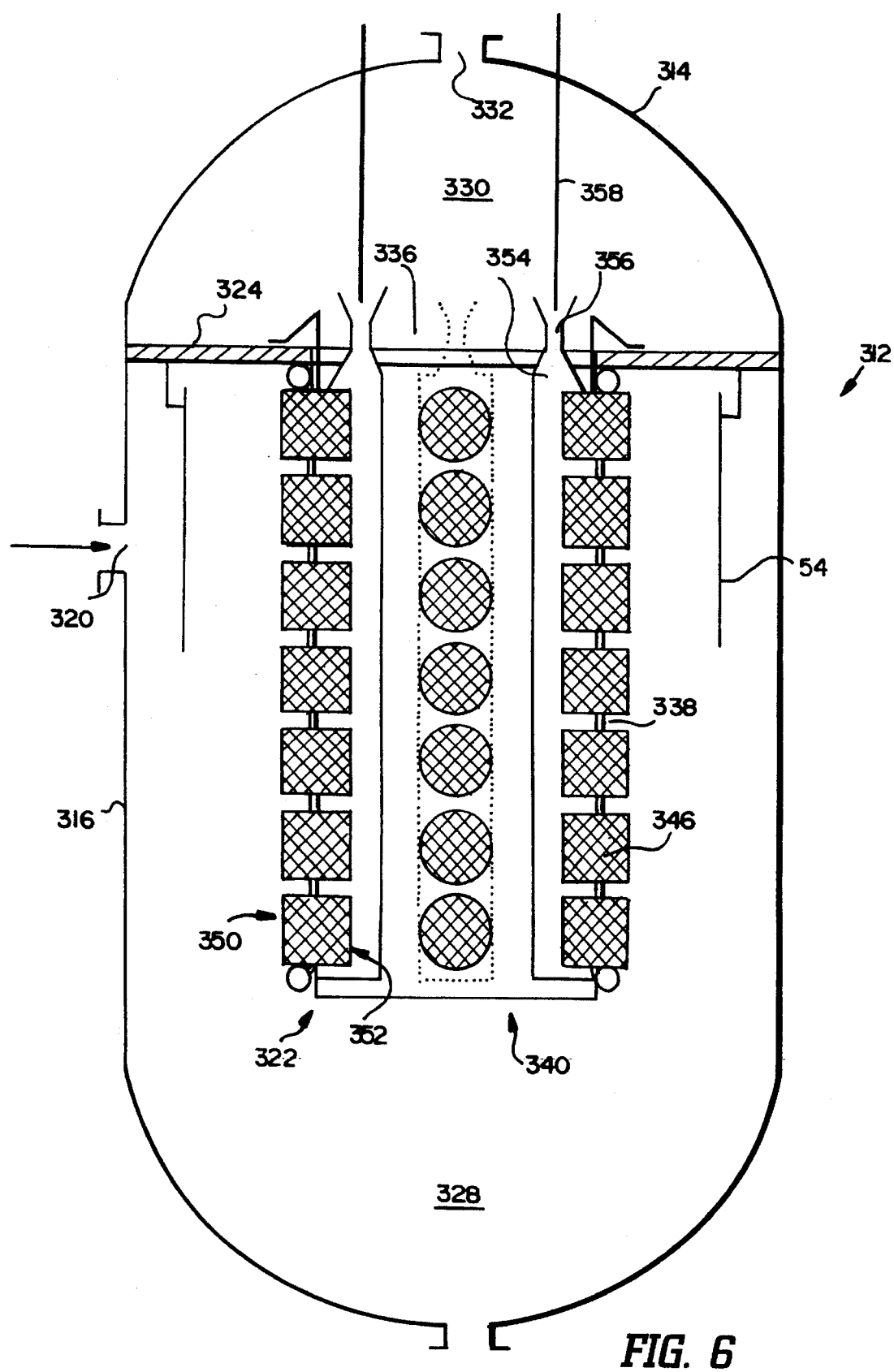
FIGS. 6 and 7 are schematic side cross-sectional views of further two other exemplary filtration apparatuses according to the present invention.

FIG. 6 shows a schematic side cross-sectional view of still another exemplary filtration apparatus according to the present invention. In FIG. 6 components comparable to those in the FIGS. 1 through 3 embodiment are shown by the same reference numeral only preceded by a "3". The apparatus includes a generally upright outer vessel 312 having a gas inlet 320 in the side wall 316 thereof and a gas outlet 332 at the top 314 thereof. A generally upright inner filtration vessel 322 is disposed within the outer vessel below a support plate 324, dividing the interior of the outer vessel 312 in a dirty gas space 328 below the support plate and a clean gas space 330 above the support plate. The inner vessel 322 has a closed bottom 340 and an opening 336 in its upper part. Filter elements 346 are inserted in the peripheral wall 338 of the inner vessel. Each filter element 346 has an inlet end 350 and an outlet end 352.

A dirty gas space 328 of gas being introduced through inlet 320 is formed in the annular space between the side walls of the outer and inner vessels. Clean gas flows through the filter elements 346 into the interior of the inner vessel and is discharged through the clean gas space 330 above the support plate and the outlet opening 332. The filter elements protrude deep into the inner vessel and are back pulsed by back pulsing means 354, 356, 358 mounted in front of the clean end 352 of the filter elements. The peripheral wall 338 of the inner vessel is formed of tube water panels as described earlier, thereby providing a reliable base for ceramic filter elements. A tubular baffle 54 may be provided, as described in co-pending application Ser. No. 08/246,221 filed May 18, 1994.

Figure 7:
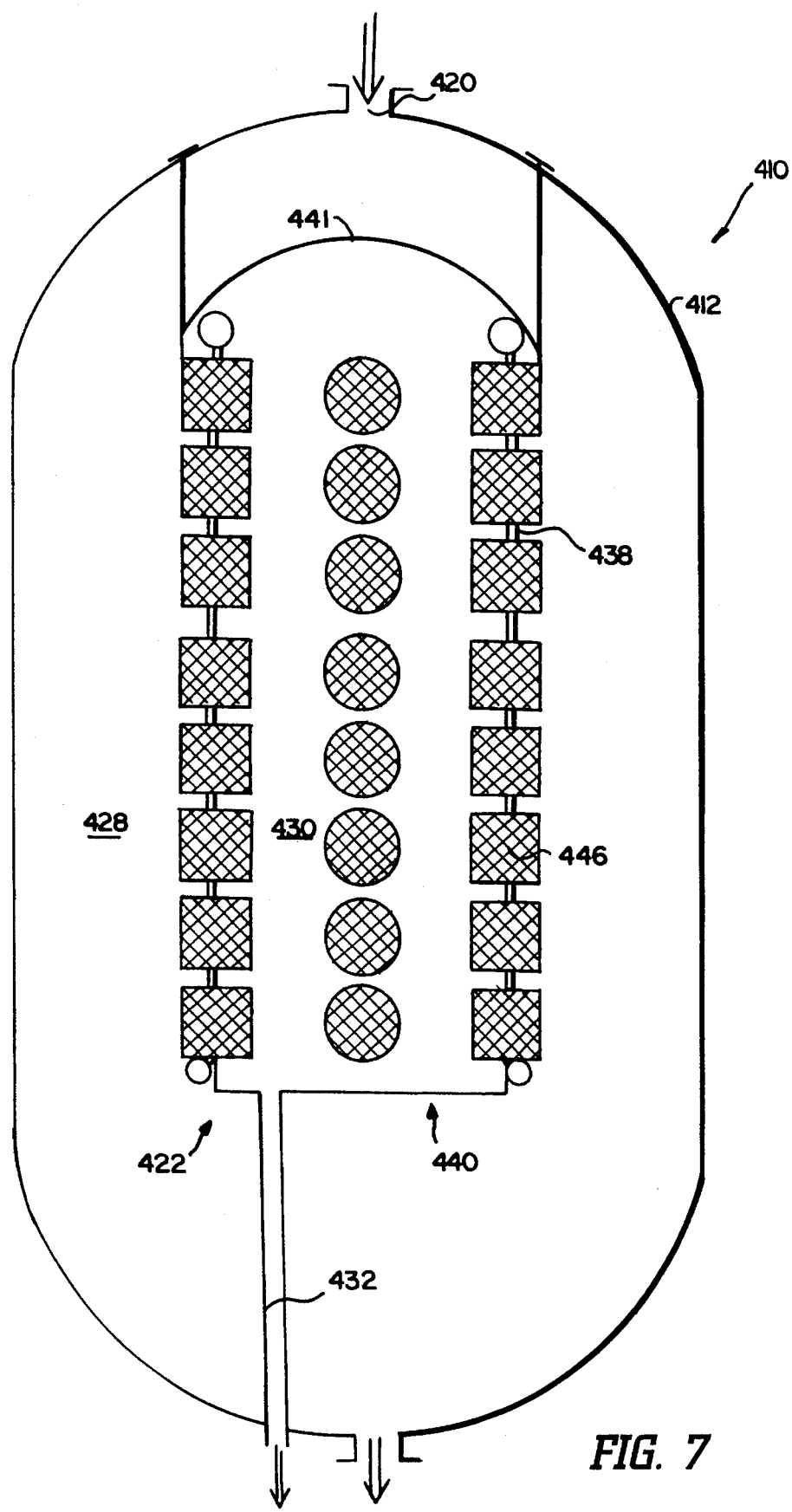

FIG. 7 shows a schematic side cross-sectional view of yet another exemplary filtration apparatus according to the present invention. In FIG. 7 components comparable to those in the FIGS. 1 through 6 embodiment are shown by the same reference numeral only preceded by a "4".

The apparatus of FIG. 7 includes a generally upright outer vessel 410 having a gas inlet 420 in the top 412 thereof. A generally upright inner filtration vessel 422 is disposed within the outer vessel. The inner vessel 422 has a closed bottom 440 and closed top 441. Filter elements 446 are provided in the peripheral wall 438 of the inner vessel. Dirty gas introduced through gas inlet 420 and guided by the top 441 radially outward within the outer vessel 412 forms a dirty gas volume 428 in the outer vessel. Clean gas flowing through the filter elements 446 into the inner vessel 422 dorms a clean gas volume 430 within the inner vessel. A clean gas conduit 432 discharges clean gas from the inner vessel through the outer vessel to the outside thereof.

The peripheral wall 438 of the inner vessel may e.g. be built according to what has earlier been shown in FIGS. 2 through 5.

Cooling of the side walls facilitates joining of ceramic filter elements to the wall as temperature differences between side wall and ceramic filter are minimized. In high temperature surroundings both side wall and joint construction may be made of less expensive material if cooled. And if it is necessary to cool the gas it can advantageously be cooled in the filter simultaneously with filtration of the gas. Heat may be recovered by connecting the water tubes up to conventional heat recovery apparatus, and can be used to produce steam or hot water.

The portions of the inner vessel 22, 322, etc. are preferably cooled to a temperature of less than about 500 degrees C. All cooling is practiced so as to even up the temperature gradient in the steel structure of essentially all the interior components, and levels out stress and tension in the steel structure as well as avoiding overheating which may damage it.

While several exemplary embodiments of the invention are shown, it is to be understood that other modifications are also possible within the scope of the invention. For example the monolithic ceramic filter elements may have other forms than the cylindrical form described above. The filter elements may additionally be coated or otherwise combine with catalytic material for catalytic processing of flue gases passing the filter elements, or the like.

The apparatus of the invention is typically used to filter gases at a temperature of greater than 400° C. The cooling panels typically keep the components of the apparatus, especially those mounting the filters, about 100° C. or more below the temperature of the gas being filtered.

That is according to the invention there also is a method of filtering either atmospheric pressure or superatmospheric pressure gases at a temperature of greater than 400 degrees C. using an upright outer vessel with at least one upright inner vessel within it, and a plurality of monolithic ceramic filter elements mounted in openings disposed in peripheral walls of the inner vessel. The method comprises the steps of: (a) passing particle laden gas at a temperature of greater than 400 degrees C. through the ceramic filter elements to filter the particles from the gas; and (b) cooling at least the portions of the inner vessel mounting the ceramic filter elements so that they have a temperature at least about 100 degrees C. lower than the temperature of the gas being filtered.

Therefore the invention is to be accorded the broadest interpretation of the appended claims so as to encompass all equivalent apparatus and processes.

What is claimed is:

1. A method of filtering either atmospheric pressure or superatmospheric pressure gases at a temperature of greater than 400 degrees C. using an upright outer vessel with at least one upright inner vessel within it, and a plurality of monolithic ceramic filter elements mounted in openings disposed in peripheral walls of the inner vessel, comprising the steps of:

(a) passing particle laden gas at a temperature of greater than 400 degrees C. through the ceramic filter elements to filter the particles from the gas; and (b) cooling at least the portions of the inner vessel mounting the ceramic filter elements so that they have a temperature at least about 100 degrees C. lower than the temperature of the gas being filtered.

2. Apparatus for filtering high temperature gases from either pressurized and atmospheric systems, comprising::

a generally upright outer vessel having a top, a bottom and a side wall;

at least one generally upright inner vessel, disposed within said outer vessel, said inner vessel having generally gas-impervious peripheral walls preventing gas from flowing through said walls and dividing the gas volume in said outer vessel into a dirty gas volume and a clean gas volume;

a plurality of monolithic ceramic filter elements mounted in openings disposed in said gas impervious peripheral walls of said inner vessel, allowing gas to flow through said filter elements from said dirty gas volume to said clean gas volume, to be cleaned; and wherein at least one of said peripheral walls includes cooling panels formed of cooling tubes.

3. Apparatus as recited in claim 2 wherein said upright inner vessel is constructed of cooling tube panels, in which adjacent vertical cooling tubes are connected to each other by fins, is disposed concentrically in said outer vessel and said monolithic ceramic filter elements are connected by their inlet, dirty, ends to openings in said cooling tube panels, the clean gas ends of said filter elements protruding through said cooling tube panels into the clean gas volume.

4. Apparatus as recited in claim 3 wherein the majority of each of the filter elements protrudes into the clean gas volume.

5. Apparatus as recited in claim 4 further comprising an inlet for dirty gas in the top of said outer vessel; an inner vessel below said inlet for dirty gas; a guiding element between said inlet and said inner vessel, for radially outwardly guiding dirty gas flowing through said inlet into said outer vessel; a dirty gas volume on the outside of said inner vessel and a clean gas volume on the inner side of said inner vessel; a solid outlet conduit in the bottom of said outer vessel;; and a clean gas outlet conduit in said inner vessel.

6. Apparatus as recited in claim 4 further comprising an inlet for dirty gas in the side wall of said outer vessel; a support plate in the upper part of said outer vessel, said support plate dividing the gas space in the outer vessel into a clean gas side above said support plate and a dirty gas side below said support plate; a connection between the upper end of said inner vessel and an opening in said support plate, so that the majority of said inner vessel is disposed below said support plate, the interior of said inner vessel being connected through said opening in said support plate to said clean gas side above said support plate, and a dirty gas volume being defined on the outside of said inner vessel; said filter elements protruding from said dirty gas side of said inner vessel inwardly into said clean gas volume inside said inner vessel; a clean gas outlet in the top of said outer vessel above said support plate, and a separated particles outlet in the bottom of said outer vessel.

7. Apparatus as recited in claim 4, further comprising an inlet for dirty gas in the top of said outer vessel; a support plate in the upper part of said outer vessel, said support plate dividing the gas volume in the outer vessel into a dirty gas side above said support plate and a clean gas side below said support plate; the upper end of said inner vessel being connected to an opening in said support plate so that the majority of said inner vessel is disposed below said support plate, the interior of said inner vessel being connected through said opening in said support plate to said dirty gas side above said support plate and a clean gas volume being provided on the outside of said inner vessel; said filter elements protruding from the dirty gas side of said inner vessel outwardly into the clean gas volume outside said inner vessel; a clean gas outlet in a side wall of said outer vessel below said support plate; and a separated particles outlet in the bottom of said inner vessel, said particles outlet connected to a particles outlet in the bottom of said outer vessel.

8. Apparatus as recited in claim 3 further comprising means for back pulsing said filter elements, mounted in front of the clean gas ends of said filter elements.

9. Apparatus as recited in claim 8 further comprising an inlet for dirty gas in the top of said outer vessel; an inner vessel below said inlet for dirty gas; a guiding element between said inlet and said inner vessel, for radially outwardly guiding dirty gas flowing through said inlet into said outer vessel; a dirty gas volume on the outside of said inner vessel and a clean gas volume on the inner side of said inner vessel; a solid outlet conduit in the bottom of said outer vessel; and a clean gas outlet conduit in said inner vessel.

10. Apparatus as recited in claim 8 further comprising an inlet for dirty gas in the side wall of said outer vessel; a support plate in the upper part of said outer vessel, said support plate dividing the gas space in the outer vessel into a clean gas side above said support plate and a dirty gas side below said support plate; a connection between the upper end of said inner vessel and an opening in said support plate, so that the majority of said inner vessel is disposed below said support plate, the interior of said inner vessel being connected through said opening in said support plate to said clean gas side above said support plate, and a dirty gas volume being defined on the outside of said inner vessel; said filter elements protruding from said dirty gas side of said inner vessel inwardly into said clean gas volume inside said inner vessel; a clean gas outlet in the top of said outer vessel above said support plate, and a separated particles outlet in the bottom of said outer vessel.

11. Apparatus as recited in claim 8, further comprising an inlet for dirty gas in the top of said outer vessel; a support plate in the upper part of said outer vessel, said support plate dividing the gas volume in the outer vessel into a dirty gas side above said support plate and a clean gas side below said support plate; the upper end of said inner vessel being connected to an opening in said support plate so that the majority of said inner vessel is disposed below said support plate, the interior of said inner vessel being connected through said opening in said support plate to said dirty gas side above said support plate and a clean gas volume being provided on the outside of said inner vessel; said filter elements protruding from the dirty gas side of said inner vessel outwardly into the clean gas volume outside said inner vessel; a clean gas outlet in a side wall of said outer vessel below said support plate; and a separated particles outlet in the bottom of said inner vessel, said particles outlet connected to a particles outlet in the bottom of said outer vessel.

12. Apparatus as recited in claim 3, further comprising an inlet for dirty gas in the top of said outer vessel; a support plate in the upper part of said outer vessel, said support plate dividing the gas volume in the outer vessel into a dirty gas side above said support plate and a clean gas side below said support plate; the upper end of said inner vessel being connected to an opening in said support plate so that the majority of said inner vessel is disposed below said support plate, the interior of said inner vessel being connected through said opening in said support plate to said dirty gas side above said support plate and a clean gas volume being provided on the outside of said inner vessel; said filter elements protruding from the dirty gas side of said inner vessel outwardly into the clean gas volume outside said inner vessel; a clean gas outlet in a side wall of said outer vessel below said support plate; and a separated particles outlet in the bottom of said inner vessel, said particles outlet connected to a particles outlet in the bottom of said outer vessel.

13. Apparatus as recited in claim 3 further comprising an inlet for dirty gas in the side wall of said outer vessel; a support plate in the upper part of said outer vessel, said support plate dividing the gas space in the outer vessel into a clean gas side above said support plate and a dirty gas side below said support plate; a connection between the upper end of said inner vessel and an opening in said support plate, so that the majority of said inner vessel is disposed below said support plate, the interior of said inner vessel being connected through said opening in said support plate to said clean gas side above said support plate, and a dirty gas volume being defined on the outside of said inner vessel; said filter elements protruding from said dirty gas side of said inner vessel inwardly into said clean gas volume inside said inner vessel; a clean gas outlet in the top of said outer vessel above said support plate, and a separated particles outlet in the bottom of said outer vessel.

14. Apparatus as recited in claim 3 further comprising an inlet for dirty gas in the top of said outer vessel; an inner vessel below said inlet for dirty gas; a guiding element between said inlet and said inner vessel, for radially outwardly guiding dirty gas flowing through said inlet into said outer vessel; a dirty gas volume on the outside of said inner vessel and a clean gas volume on the inner side of said inner vessel; a solid outlet conduit in the bottom of said outer vessel; and a clean gas outlet conduit in said inner vessel.

15. Apparatus as recited in claim 2 wherein at least some of said monolithic ceramic filter elements are mounted in openings provided in broad fins between adjacent cooling tubes, the width of said broad fins being primarily essentially the same as the diameter of said filter elements.

16. Apparatus as recited in claim 2 wherein at least some of said monolithic ceramic filter elements are mounted in openings provided in one of said cooling tube panels by bending apart two adjacent cooling tube to provide a space between said cooling tubes corresponding to the diameter of said ceramic filter elements.

17. Apparatus as recited in claim 2 wherein said monolithic filter elements are connected to openings in a cooling tube panel, said filter elements protruding at both or either side of said cooling tube panel; and a layer of refractory material covers each side of the cooling tube panel, such that the ends of the ceramic elements and the surface of said refractory material form a primarily smooth outer and inner surface in said inner vessel.

18. Apparatus as recited in claim 2 wherein openings for filter elements are provided in several parallel columns spaced from each other, in which columns the openings are provided one on top of the other spaced from each other; and further comprising connecting elements at least in the vertical parts of the openings in at least one of said peripheral wlr for providing a seat for said monolithic ceramic filter elements; and vertical cooling tube panels having essentially the same horizontal width as the length of said ceramic filter elements disposed between said ceramic filter elements in a 90° angle to the plane of the peripheral wall of the inner vessel, for cooling said connecting elements.

19. An apparatus as recited in claim 18 wherein said cooling tube panels are constructed of two to four vertical water cooling tubes connected by fins; and further comprising heat transferring fins or bars connecting said cooling tubes with said connecting elements, for cooling said connecting elements.

20. Apparatus as recited in claim 2 wherein all of said peripheral walls of said inner vessel are made of said cooling tube panels.

21. Apparatus as recited in claim 2 wherein said cooling tubes of said cooling panels circulate water, steam, or air therethrough.

* * * * *